United States Patent [19]

Pearson et al.

[11] Patent Number: 5,194,243

[45] Date of Patent: Mar. 16, 1993

[54] PRODUCTION OF ALUMINUM COMPOUND

[75] Inventors: Alan Pearson, Murrysville, Pa.; James R. Wall, deceased, late of Edwardsville, Tex., by Alberta C. Wall, executrix

[73] Assignee: Aluminum Company of America, Pittsburgh, Pa.

[21] Appl. No.: 781,208

[22] Filed: Sep. 30, 1985

Related U.S. Application Data

[63] Continuation of Ser. No. 534,665, Sep. 22, 1983, abandoned.

[51] Int. Cl.$^5$ ................................................ C01F 7/02
[52] U.S. Cl. ...................................... 423/625; 23/301; 23/305 A
[58] Field of Search ............... 423/625; 23/301, 305 A

[56] References Cited

U.S. PATENT DOCUMENTS

| | | | |
|---|---|---|---|
| 3,268,295 | 8/1966 | Armbrust et al. | 423/625 |
| 4,102,978 | 7/1978 | Kiovsky | 423/628 |
| 4,154,812 | 5/1979 | Sanchez et al. | 423/625 |
| 4,224,302 | 9/1980 | Okamoto et al. | 423/625 |
| 4,277,376 | 7/1981 | Paolasini | 423/628 |

Primary Examiner—Michael Lewis
Assistant Examiner—Steven J. Bos
Attorney, Agent, or Firm—Douglas P. Mueller; Daniel A. Sullivan, Jr.

[57] ABSTRACT

A method of manufacture including bringing seed and aluminum hydroxide together in an aqueous medium and hydrothermally digesting for producing boehmite at the expense of the aluminum hydroxide.

22 Claims, 2 Drawing Sheets

= 0.1 MICRONS

PRODUCTION OF ALUMINUM COMPOUND

This is a continuation of co-pending application Ser. No. 534,665 filed on Sept. 22, 1983, now abandoned.

Field of the Invention

The present invention relates to a method for producing a compound of aluminum containing oxygen and hydroxide.

SUMMARY OF THE INVENTION

It is an object of the present invention to provide a method for preparing a compound of aluminum containing oxygen and hydroxide.

This as well as other objects which will become apparent in the discussion that follows are achieved, according to the present invention, by providing a method of manufacture, including the steps of bringing seed, e.g. boehmite seed material having a crystal size less than 0.05 microns, and aluminum hydroxide (that is, a hydrated alumina boehmite precursor) together in an aqueous medium and hydrothermally digesting for producing boehmite at the expense of the aluminum hydroxide.

PRODUCT OF THE INVENTION

Colloidal, e.g. 35 to 250 m$^2$/g, boehmite (also referred to as pseudoboehmite, alumina monohydrate and aluminum oxide hydroxide), especially in a form capable of forming stable aqueous dispersions, is a very useful material. Such boehmite has been produced commercially, e.g. as a by-product of the Ziegler process for making primary alcohols. This is an alkoxide-based approach. A number of applications have developed for this type of product including frictionizing agent for paper bags and boxes, antistatic agent for carpets and textiles, binder for catalysts and special ceramics, and thixotropic agent and viscosity control for various suspensions.

DESCRIPTION OF THE PREFERRED EMBODIMENTS

Figure 1:
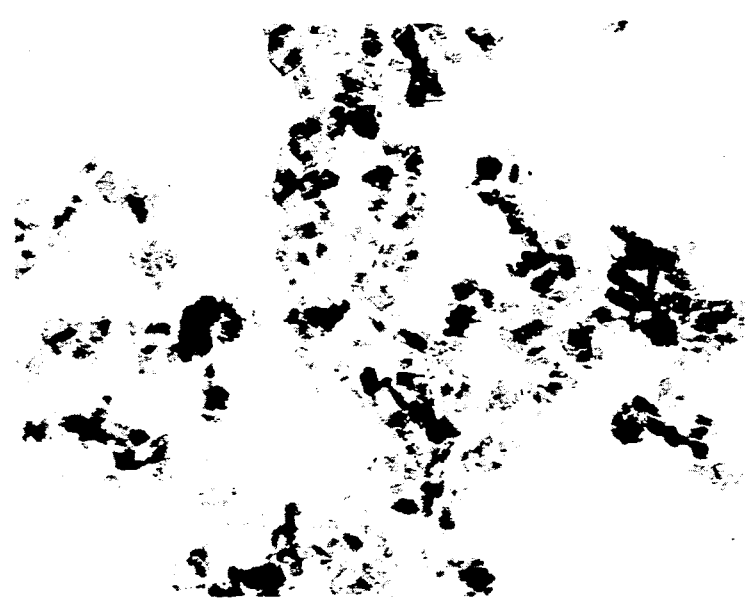
FIGS. 1 to 3 are transmission electron photomicrographs of the colloidal boehmite products resulting from differing relative amounts of aluminum hydroxide in the feed mixture.

The invention is an improved process for manufacture of colloidal alumina by hydrothermal digestion of a mixture of alumina hydroxide and a high surface area alumina seed. Aluminum hydroxide is also called "alumina trihydrate" and "gibbsite". Aluminum hydroxide can also have crystal structures other than that of gibbsite. Examples are bayerite or nordstrandite.

According to the invention, a highly dispersible, inexpensive colloidal boehmite can be produced by the following process: (a) prepare a high, e.g. greater than about 100 m$^2$/g, where m$^2$/g stands for square meters per gram, surface area, well dispersed, e.g. median particle size less than about 500 Ångstroms, (about 0.05 microns), or even less than about 50 micros Ångstroms (about 0.005 microns), alumina seed consisting essentially of amorphous or microcrystalline boehmite phases; (b) mix this seed material plus water with a less expensive alumina product such as gibbsite to form an aqueous slurry; (c) convert the mixture to a colloidal boehmite by hydrothermally digesting the mixture.

Using the process of the invention, one can prepare dispersible alumina with the high surface area component amounting to as little as 5% of the feed and the less expensive gibbsite amounting to 95%. Thus, the seed particles may be present in an amount of at least 5% by weight of the precursor alumina calculated as Al$_2$O$_3$, for example in the amount of 15% by weight or 50% by weight. Apparently, during the hydrothermal digest, the high surface area component is quickly converted to colloidal boehmite while the gibbsite component slowly converts to boehmite through a dissolution-seeding mechanism. The process of the invention can occur in the pH range of 2 to 11, preferably 4 to 10, which is surprising, because alumina has very little solubility in this range. From these ranges it will be apparent that the present invention can be practiced with either an acidic or a basic digest. An advantage of the acid digest is that for a given an aluminum hydroxide content and seed surface area, the acidic digest gives the greater surface area in the boehmite product.

Advantages of the invention include that a substantial amount of the alumina is furnished by a low cost material and no washing or filtration of the product is required after conversion to boehmite. Lack of need for filtration is especially important because colloidal boehmite is quite difficult to filter and wash. In the alkoxide-based approach of e.g. U.S. Pat. No. 3,357,791, little or no washing is required but the starting material is quite expensive.

Other methods of producing this type of material have also been proposed and each has disadvantages compared to the process of this invention. Colloidal boehmite can be prepared by hydrothermal treatment of amorphous alumina gel or aluminum salt solutions (e.g. U.S. Pat. Nos. 2,763,620 and 2,915,475), but raw materials tend to be expensive, and washing is required after conversion to boehmite to remove the associated salts. Another approach involves hydrothermal digestion of very fine gibbsite in a specific mixture of salts (U.S. Pat. No. 3,385,663), but, again, the starting materials are expensive and washing is required. In still another approach, activated alumina is hydrothermally digested with water (U.S. Pat. No. 4,117,105). This process avoids the need for washing, but yields are low unless very fine gibbsite is used, and consequently raw material costs are high. Yields can be improved by digesting activated alumina in the presence of acid (U.S. Pat. No. 4,344,928), but high yields require a large amount of acid which becomes expensive and must be washed out. Although some of these expenses still apply to the high surface area seed component of our process, the overall cost is diluted by addition of the low-cost aluminum hydroxide component.

The high surface area component provides a colloidal seed and can be prepared in any manner that results in a high surface area amorphous alumina or boehmite. Minor contamination of this seed with other phases such as bayerite or gibbsite can be tolerated since they will convert to boehmite during the hydrothermal digest. It is even conceivable to use a seed of a material other than alumina, for example a material having a crystal structure approximating that of boehmite, where the contamination does not matter in the end use of the product. Examples of processes that can be used to provide high surface area seed are hydrolysis of aluminum alkoxides and the many well-known alumina gel reactions. Regardless of which approach is taken, the seed must have high surface area and be capable of attaining a well-dispersed condition. For a desired surface area in the product boehmite, the higher the surface area of the seed, the greater is the permissible proportion of aluminum hydroxide in the seed-aluminum hydroxide mixture; there is some trade-off here in that, while the greater proportion of aluminum hydroxide is a savings, higher surface area seed is more expensive. Impurities such as organics or inorganic salts formed in the seed preparation process should be removed before digestion since filtration and washing of the material after digestion are very difficult. Degree of seed washing required will depend on the purity desired in the final product.

While recognizing that seed surface area and particle size are factors affecting the process, it is well to note that it is preferred to accept the seed manufacturers information on surface area and particle size at face value and to control the process on the basis of the surface area resulting in the boehmite end product. If the seed is being made on-site, seed producing processes such as detailed in the examples below can be run without there being any measurements made of the seed surface area or particle size, and the adequacy of the seed checked by measurement of the surface area in the boehmite end product. In this sense, it can be said that seed surface area and particle size for the invention are those effective for producing boehmite of surface area in the range 35–250 m$^2$/g.

The low cost aluminum hydroxide component can be gibbsite or bayerite. It is desirable to use a fine particle size aluminum hydroxide (nominally 5 micron crystal size or less) since coarser particles will require more severe digestion conditions (higher temperature, longer time) to completely react and lead to a somewhat lower surface area product. The fine particle size can be attained either by precipitation or grinding.

If dispersing agents are used to peptize the system, they should be effective but not interfere with the end use. For example, chlorides and sulfates are generally undesirable in catalytic applications. Nitric acid is preferred since it is a very effective peptizing agent in the pH range of about 5 or less and is generally not objectionable in the product.

The hydrothermal digestion of the invention is carried out in a closed pressure vessel (e.g. an autoclave) preferably without supplemental pressure regulation by nitrogen introduction or the like, (i.e., autogenous pressure) i.e. reading the pressure essentially permits knowledge of temperature by way of the pressure-temperature relationship for steam in equilibrium with water. The conditions, including pH, temperature and pressure, are such that boehmite is maintained as a stable phase for a time sufficient for the conversion of the boehmite precursor to microcrystalline boehmite. Preferred batch digest conditions include a temperature of at least about 180° C., preferably about 180 to 220° C for about one hour. Percent solids (seed plus hydroxide) can be from e.g. 2 to 40%, preferably 4½ to 20%.

Further illustrative of the principles of the invention are the following examples, the parameters and results of which are tabularly presented in Table I (S.A. stands for surface area, H-710 for Hydral 710 gibbsite of Aluminum Company of America). The boehmite products of these examples yield X-ray diffraction patterns matching those of cards 5-0190 and 21-1307 of the Joint Committee on Powder Diffraction Standards, Swarthmore, PA.

COMPARATIVE EXAMPLES 1 AND 2

Example 1

This example shows the properties of boehmite made by digesting a fine crystalline gibbsite without seed addition, in order to establish baseline properties for comparison to the present invention. A commercial, precipitated aluminum hydroxide in the form of gibbsite (Hydral 710 gibbsite) having BET surface area of 6 m$^2$/g and size distribution as shown by curve "710" in FIG. 4 was selected as the test material. It is nominally one-micron material as determined by the abscissa for the point having an ordinate of 50% on its size distribution curve. This material was digested as a 10% (Al$_2$O$_3$ basis) suspension in water for 1 hour at 200° C. The resulting boehmite product had a surface area of 9.9 m$^2$/g.

Example 2

The experiment of Example 1 was repeated but 2.0 g HNO$_3$/100 g Al$_2$O$_3$ were added before digestion. The resulting product was significantly finer with a surface area of 19.9 m$^2$/g.

EXAMPLES OF THE INVENTION

Example 3

This example shows the effect of seeding during digestion with a sulfate-derived alumina gel. It additionally illustrates an approach to the invention lacking addition of an: acidic peptizing agent before digestion.

The alumina monohydrate, i.e. boehmite, was made by digestion of a 50-50 mixture (Al$_2$O$_3$ basis) of gelatinous alumina seed and 1-micron size alumina trihydrate (Hydral 710 gibbsite).

The alumina gel seed was prepared by rapidly adding a solution of sodium aluminate to a dilute solution of aluminum sulfate at 50° C. in such proportion that the pH of the finished mix is approximately 10. After 1 hour of agitation the gel was filtered and washed.

The gel cake which contained about 5% Al$_2$O$_3$ (95% H$_2$O) was mixed with the Hydral gibbsite and water added to give a slurry containing 4.3T Al$_2$O$_3$. The slurry was placed in a nickel-plated steel pressure vessel and digested at 200° C. for 1½ hours. The vessel was cooled and the product slurry removed. The slurry after digestion had a lower viscosity than before the digest. It also had lower opacity. Its pH was 10.25 (the pH before the digest was 9.8). This is thus an example of a basic digest. The slurry was filtered and washed. The filter cake was gel-like. It contained 16% Al$_2$O$_3$. To the filter cake was added glacial acetic acid, in amount equal to about 3% of the Al$_2$O$_3$ content. This caused peptization and liquefaction of the filter cake, yielding a translucent sol. The resulting sol was then placed in an oven to dry at 105° C.

The product shrank to a firm, hard, porcelain-like mass during drying. However, it was not difficult to grind it to a powder. When this powder was mixed with water, it quickly dispersed and regained the appearance that it had drying. Its pH was 4.3, due to addition of acetic acid. This dispersion, when applied to a glass surface, dried to an adherent, nearly transparent film.

The chemical analysis of the product was:

| | |
|---|---|
| Ignition loss | 21.27% |
| $SO_3$ | .12% |
| $Na_2O$ | .03% |
| Acetic acid | 1.90% |
| $Al_2O_3$ (calculated) | 78.7% |

X-ray diffraction analysis showed only boehmite and BET surface area was 159 $m^2/g$.

Examples 4a and 4b

These examples show the effect of seeding with a gel derived by a different approach. To prepare the gel, sodium aluminate liquor was rapidly neutralized by gassing with $CO_2$ and washed to remove residual sodium carbonate. The resulting "gel" was a mixture of amorphous alumina and microcrystalline boehmite. Portions of this gel were slurried with water and Hydral 710 gibbsite in such a way that the final mixture contained 5% solids ($Al_2O_3$ basis). In one case (Example 4a), equal amounts of Hydral and gel were used ($Al_2O_3$ basis) and in the other case (Example 4b) a mixture of 75% Hydral/25% gel was used. After digesting for 1 hour at 190° C., the products were micrycrystalline boehmites having surface areas of 164 and 91 $m^2/g$, respectively.

Examples 5a to 5d

These examples show the additional improvement in properties which can be achieved by seeded digestion in the presence of a peptizing agent. The experiments of Examples 4a and 4b were repeated except in each case the mixture pH was adjusted to 4.0 with $HNO_3$ before digestion. This is thus an example of an acid digest. Tests were also included in which the Hydral 710 gibbsite content was increased to 85 and 95%. Surface area data are shown in the Table and for a given gel content are significantly higher than in Examples 4a and 4b. This shows that while a peptizing agent is not necessary in the seeded digestion process, its use will produce higher surface area products and/or allow a reduction in the seed amount.

Figure 2:
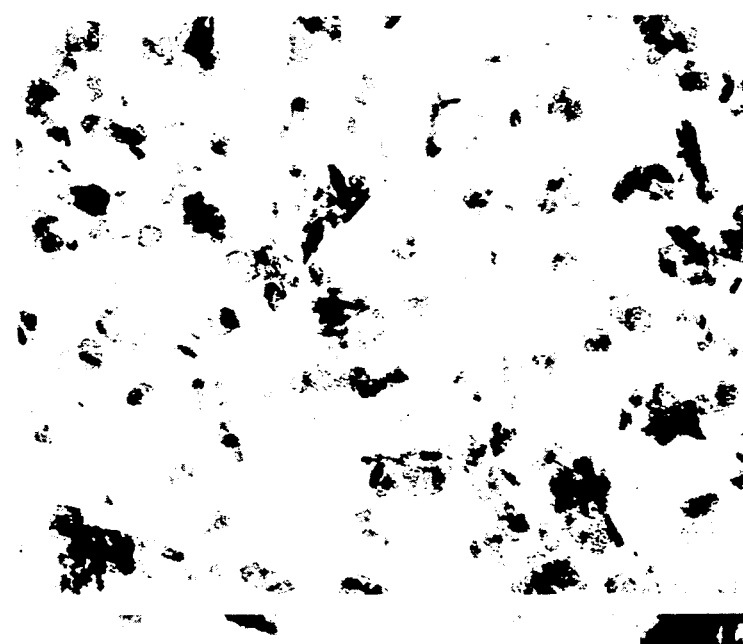
Figure 3:

Transmission electron micrographs of digested products representing 75, 85 and 95% Hydral feed are shown in FIGS. 1 to 3, respectively. These pictures show that seeded digestion results in quite uniform boehmite crystallites which can be orders of magnitude smaller than the gibbsite feed component.

Example 6

This example demonstrates that the gibbsite source is not limited to Hydral 710 gibbsite. A precipitated gibbsite having a median (ordinate of 50 cumulative mass percent) particle size of 3.9 μm (Product A in FIG. 4) was mixed with the type of gel described in Examples 4a and b so that a 20% solids aqueous suspension ($Al_2O_3$ basis) resulted, with 25% of the alumina furnished by the gel and 75% furnished by the gibbsite. The pH of the suspension was adjusted to 4.0 with $HNO_3$ before digestion. After digestion for one hour at 190° C., the resulting product was microcrystalline boehmite having a surface area of 152 $m^2/g$, the same as the product of Example 5b.

Examples 7a and 7e

These examples show the effect of varying digestion temperature on product properties. The experiment of Example 5b was repeated but at 20% solids and at digest temperatures (1 hour hold) ranging from 155 to 225° C. In each test, pH of the slurry was adjusted to 4.0 with $HNO_3$ before digestion. After digestion, portions of the slurries were spread on glass and allowed to dry. The quality of the resulting film was observed visually as an indication of colloidal properties. A transparent, glassy film indicates very fine porosity, meaning fine particles in a well-dispersed state. As particle size increases, the film takes on an opaque or porcelaine appearance, and as the particles approach micron size, the dry residue becomes a chalky powder rather than a tough film. The results of this series are shown below:

| | Product Properties | | | |
|---|---|---|---|---|
| Sample | Digest Temp. (°C.) | Surface Area ($m^2/g$) | Dry Film Appearance | XRD* Analysis |
| 7A | 155 | — | Opaque, cracked | Major Gibbsite Major Boehmite |
| 7B | 175 | — | Glassy, cracked | Minor Gibbsite Major Boehmite |
| 7C | 190 | 150 | Glassy | Boehmite |
| 7D | 200 | 132 | Glassy | Boehmite |
| 7E | 225 | 98 | Porcelain | Boehmite |

*X-ray diffraction analysis

These data show that, for good conversion of gibbsite to colloidal boehmite, some minimum digest conditions must be achieved. One hour at 155° C. was insufficient since the product contained a major amount of gibbsite. One hour at 175° C. was almost sufficient, but a minor amount of gibbsite still remained. It should be recognized that more complete conversion can be accomplished by longer holding times at these low temperatures. Conversely, holding times shorter than one hour can be matched with high temperatures to obtain the desired amount of conversion. It should also be recognized that unreacted gibbsite can be separated from the product slurry by known techniques such as filtration, sedimentation, centrifugation, etc. Also, in some applications, some residual gibbsite in the product may be acceptable.

As digest temperature was increased above 175° C., full conversion was achieved. At 225° C., surface area was significantly reduced and the film had taken on a porcelain appearance.

Examples 8a and 8b

These examples show that ground gibbsite can be used in the process of this invention as well as the precipitated products described above. Bayer process gibbsite was mechanically ground to a 3.5 μm median particle size indicated by curve B in FIG. 4. The experiment of Example 7d was repeated, except hydrate B of FIG. 4 was substituted for Hydral 710 gibbsite. The resulting product had a surface area of 125 $m^2/g$ and produced a glassy film.

The same experiment was repeated, but a coarser ground Bayer process hydrate (7 μmedian, curve C in FIG. 4) was substituted as the gibbsite component. After digestion, the product had a surface area of 106 $m^2/g$ and produced a cracked, porcelain-appearing film. Also, the digested slurry contained a significant amount of coarse material which settled on standing. As indicated by the particle size distribution curve of FIG. 4, the feed hydrate contained some rather coarse particles with 40% above 10 μm and 15% above 20 μm. Under the digest conditions used, these coarser particles were not completely converted to colloidal boehmite. This coarser hydrate could be used as a feedstock for micrycrystalline boehmite production, but an auxiliary processing step to remove coarse material before or after digestion would probably be needed.

Examples 9a and 9c

These example demonstrate that other types of seed can be used in the process of this invention. A commercial colloidal boehmite (Catapal ® SB, Product of Conoco) derived from hydrolysis of alkoxides was used as the seed component in these tests. As a baseline experiment, a 10% solids slurry of Catapal SB was adjusted to pH 4.0 with $HNO_3$ and digested 1 hour at 200° C. This treatment is similar to that described in U.S. Pat. No. 4,360,449. The product had a surface area of 152 $m^2/g$. The test was repeated, but Hydral 710 was added so that equal amounts ($Al_2O_3$ basis) of Catapal SB boehmite and Hydral 710 gibbsite were present in the feed. The resulting product had a surface area of 151 $m^2/g$. The experiment was again repeated, but this time ground hydrate B (FIG. 4) was the gibbsite source. After digestion, the product surface area was 159 $m^2/g$.

TABLE I

Summary of Examples and Results

| Example | Seed Source | % | Aluminum Hydroxide Source | % | Digest Conditions Time (hr.) | Temp. (°C.) | % Solids | $HNO_3$ | Product S.A. |
|---|---|---|---|---|---|---|---|---|---|
| 1 | — | 0 | H-710 | 100 | 1 | 200 | 10 | no | 9.9 |
| 2 | — | 0 | H-710 | 100 | 1 | 200 | 10 | yes | 19.9 |
| 3 | Sulfate gel | 50 | H-710 | 50 | 1.5 | 200 | 4.3 | no | 159 |
| 4a | $CO_2$ gel | 50 | H-710 | 50 | 1 | 190 | 5 | no | 164 |
| 4b | $CO_2$ gel | 25 | H-710 | 75 | 1 | 190 | 5 | no | 91 |
| 5a | $CO_2$ gel | 50 | H-710 | 50 | 1 | 190 | 5 | yes | 223 |
| 5b | $CO_2$ gel | 25 | H-710 | 75 | 1 | 190 | 5 | yes | 152 |
| 5c | $CO_2$ gel | 15 | H-710 | 85 | 1 | 190 | 5 | yes | 140 |
| 5d | $CO_2$ gel | 5 | H-710 | 95 | 1 | 190 | 5 | yes | 114 |
| 6 | $CO_2$ gel | 25 | A* | 75 | 1 | 190 | 20 | yes | 152 |
| 7d | $CO_2$ gel | 25 | H-710 | 75 | 1 | 200 | 20 | yes | 132 |
| 7e | $CO_2$ gel | 25 | H-710 | 75 | 1 | 225 | 20 | yes | 98 |
| 8a | $CO_2$ gel | 25 | B* | 75 | 1 | 200 | 20 | yes | 125 |
| 8b | $CO_2$ gel | 25 | C* | 75 | 1 | 200 | 20 | yes | 106 |
| 9a | Catapal ® SB | 100 | — | — | 1 | 200 | 10 | yes | 152 |
| 9b | Catapal ® SB | 50 | H-710 | 50 | 1 | 200 | 10 | yes | 151 |
| 9c | Catapal ® SB | 50 | B* | 50 | 1 | 200 | 10 | yes | 159 |

Figure 4:
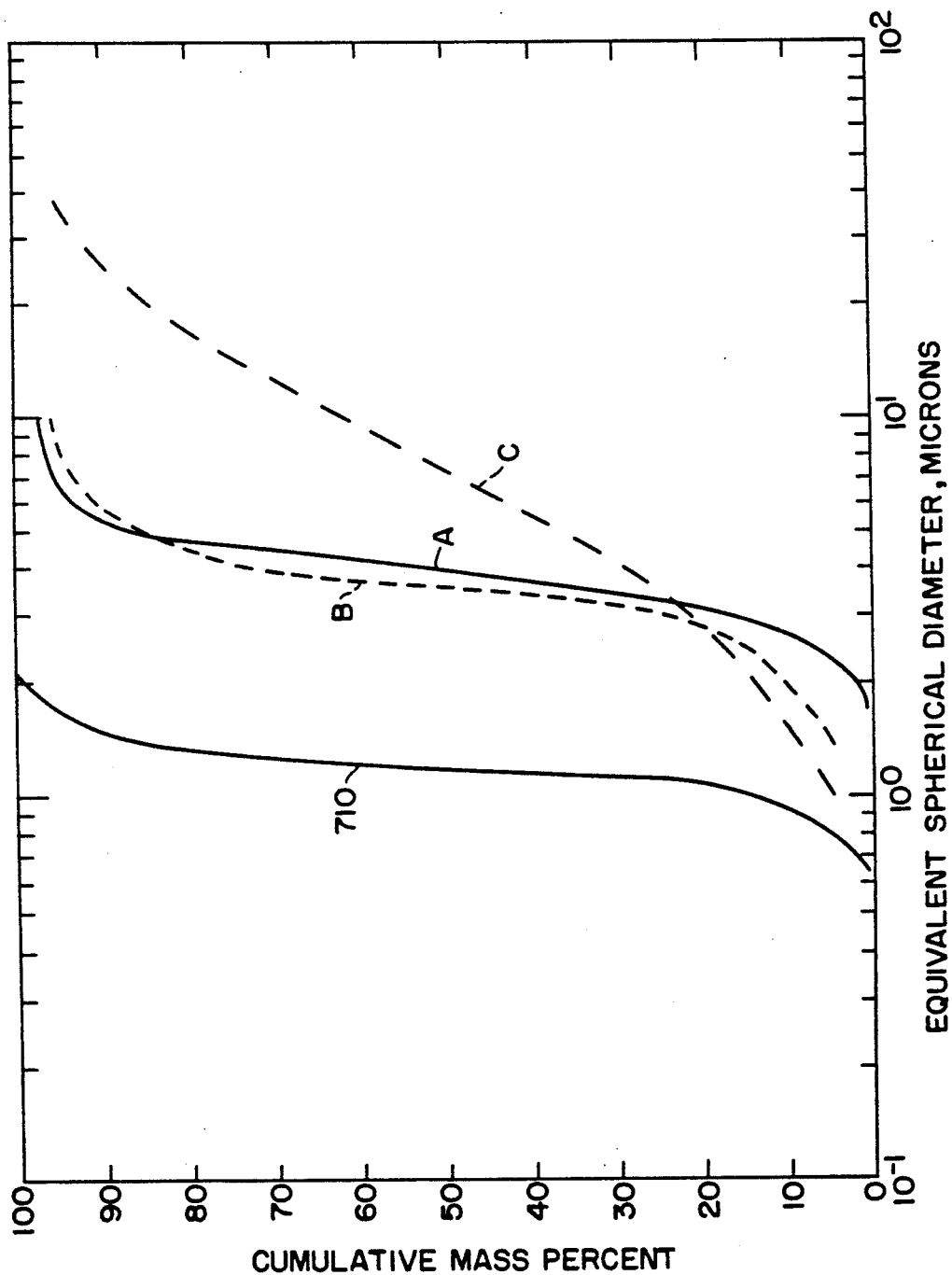
FIG. 4 shows particle size distribution of the aluminum hydroxides used in the examples; "cumulative" signifies that, for a given point on a size distribution curve, the ordinate is the mass percent of material having particle sizes less than the corresponding abscissa.

*Curves in FIG. 4:
A = 3.8 microns average particle size, precipitated
B = 3.5 microns average particle size, ground
C = 7.0 microns average particle size, ground Unless indicated otherwise, percentages herein are weight-percents.

It will be understood that the above description of the present invention is susceptible to various modifications, changes and adaptations and the same are intended to be comprehended within the meaning and range of equivalence of the appended claims.

What is claimed is:
1. A method of manufacture, comprising the steps of:
(1) bringing

(a) aluminum hydroxide selected from the group consisting of gibbsite, bayerite, and norstrandite, and
(b) seed effective for boehmite growth,
together in a liquid aqueous medium to form a mixture comprising aluminum hydroxide, seed and liquid aqueous medium and
(2) hydrothermally digesting the mixture in a pressure vessel for producing colloidal boehmite at the expense of the aluminum hydroxide.

2. A method as claimed in claim 1, including a dispersing agent in the digesting step.

3. A method as claimed in claim 1, wherein at least 50% of the quantity seed plus aluminum hydroxide is aluminum hydroxide.

4. A method as claimed in claim 1, the seed having a surface area of at least about 100 $m^2/g$ 5. A method as claimed in claim 1, the aluminum hydroxide having an average particle size equal to or less than 5 microns.

6. A method as claimed in claim 1, the step of digesting being at about 180 to 220° C. for about one hour.

7. A method as claimed in claim 1, percent solids in the digest being in the range 2 to 40%.

8. A method as claimed in claim 7, percent solids in the digest being in the range 4½ to 20%.

9. A method as claimed in claim 1, pH during digest being in the range of 2 to 11.

10. A method as claimed in claim 9, pH during digest being in the range of 4 to 10.

11. A method as claimed in claim 1, wherein the digest is an acidic digest.

12. A method as claimed in claim 1, wherein the digest is a basic digest.

13. A method as claimed in claim 1, the boehmite having a surface area in the range 35-250 $m^2/g$.

14. A method as claimed in claim 1, the seed being, except for minor contamination, a material other than said aluminum hydroxide.

15. A method of making colloidal boehmite which forms a glassy film upon drying, the colloidal boehmite having properties including boehmite particle surface area of about 35 to 250 m²/g and aqueous dispersibility, comprising the steps of:
(1) forming a mixture of
  (a) aluminum hydroxide selected from the group consisting of gibbsite, bayerite and nordstrandite, the aluminum hydroxide having a fine particle size of about 5 microns or less,
  (b) seed effective for boehmite growth, the seed being amorphous alumina or boehmite, the seed having a surface area of at least about 100 m²/g and a median particle size less than about 500 Angstroms, and
  (c) a liquid aqueous medium,
(2) hydrothermally digesting the mixture in a pressure vessel for a time sufficient to substantially convert the aluminum hydroxide to said colloidal boehmite, wherein the temperature of the digest is about 180 to 220° C., the percent solids of the aluminum hydroxide and the seed in the digest is in the range of 2 to 40% Al₂O₃, and the pH during digest is in the range of 2 to 11, and
(3) peptizing the mixture before or after said digesting step.

16. A method as claimed in claim 13, the boehmite being dispersible to a median particle size less than about 500 Angstroms.

17. A method of producing microcrystalline boehmite comprising reacting in an autoclave a hydrated alumina boehmite precursor in the presence of water and boehmite seed material having a crystal size less than about 0.05 microns, the temperature, pressure, and pH being maintained at conditions under which boehmite is a stable phase for a time sufficient to convert the major portion of said precursor to microcrystalline beohmite.

18. A method of producing microcrystalline boehmite as recited in claim 17, wherein the crystal size of said boehmite seed material is less than about 0.005 microns.

19. A method of making a microcrystalline boehmite product comprising heating under autogenous pressure a boehmite alumina precursor in an aqueous medium having an acidic or basic pH in the presence of boehmite seed particles finer than about 0.05 microns, said seed particles being present in an amount of at least 5% by weight of the precursor alumina, calculated as Al₂O₃, said heating being carried out above 180° C. for about one hour.

20. A method as in claim 19 in which said pH is about 4 and said boehmite seed particles are present in an amount of at least 15% by weight of the precursor alumina, calculated as Al₂O₃.

21. A method as in claim 20, wherein the boehmite seed particles are finer than about 0.005 microns and are present in an amount of about 50% by weight of the precursor alumina, calculated as Al₂O₃.

22. In a process of producing a product from a boehmite material, the improvement wherein the boehmite material is prepared by:
  a. bringing a hydrated boehmite precursor and seed effective for boehmite growth together in a liquid aqueous medium to form a mixture comprising hydrated boehmite precursor, seed and liquid aqueous medium; and
  b. hydrothermally digesting the mixture in a pressure vessel to produce colloidal boehmite at the expense of the hydrated boehmite precursor.

* * * * *

UNITED STATES PATENT AND TRADEMARK OFFICE
CERTIFICATE OF CORRECTION

PATENT NO. : 5,194,243

DATED : March 16, 1993

INVENTOR(S) : Alan Pearson and James R. Wall, deceased

It is certified that error appears in the above-identified patent and that said Letters Patent is hereby corrected as shown below:

Column 2, line 24        Delete "an" and insert --%--.

Column 4, line 49        Delete "T" and insert --%--.

Signed and Sealed this

Twenty-eighth Day of December, 1993

Attest:

BRUCE LEHMAN

Attesting Officer    Commissioner of Patents and Trademarks